United States Patent [19]

Willging

[11] Patent Number: 4,814,039

[45] Date of Patent: Mar. 21, 1989

[54] SUBSTANTIALLY VISCOSITY STABLE MOISTURE-RESISTANT CORRUGATED BOARD ADHESIVE

[75] Inventor: Stephen M. Willging, Minneapolis, Minn.

[73] Assignee: H. B. Fuller Company, St. Paul, Minn.

[21] Appl. No.: 104,211

[22] Filed: Oct. 2, 1987

[51] Int. Cl.[4] .................... C09J 3/02

[52] U.S. Cl. .................... 156/328; 156/205; 156/210; 156/292; 524/47; 524/592; 524/593

[58] Field of Search .................... 156/205, 210, 328, 292; 524/47, 593, 592

[56] References Cited

U.S. PATENT DOCUMENTS 2,529,851 11/1950 Scrutchfield .................... 524/47
2,890,182 6/1959 Langlois et al. .................... 260/17.2
3,562,001 2/1971 McGuire .................... 524/47
3,865,616 2/1975 Åkerblom .................... 524/47
4,033,914 7/1977 Bovier et al. .................... 524/47
4,366,275 12/1982 Silano et al. .................... 524/47

OTHER PUBLICATIONS

Kirk-Othmer Encyclopedia of Chemical Technology, 2nd Edition, vol. 3, pp. 608-652.

*Primary Examiner*—John J. Gallagher
*Attorney, Agent, or Firm*—Merchant, Gould, Smith, Edell, Welter & Schmidt

[57] ABSTRACT

Resin shock, the unwanted viscosity increase caused by the addition of certain reactive resins to boron containing alkaline starch-based corrugated board adhesives, can be reduced by the presence of compounds containing hydroxyl groups.

20 Claims, 1 Drawing Sheet

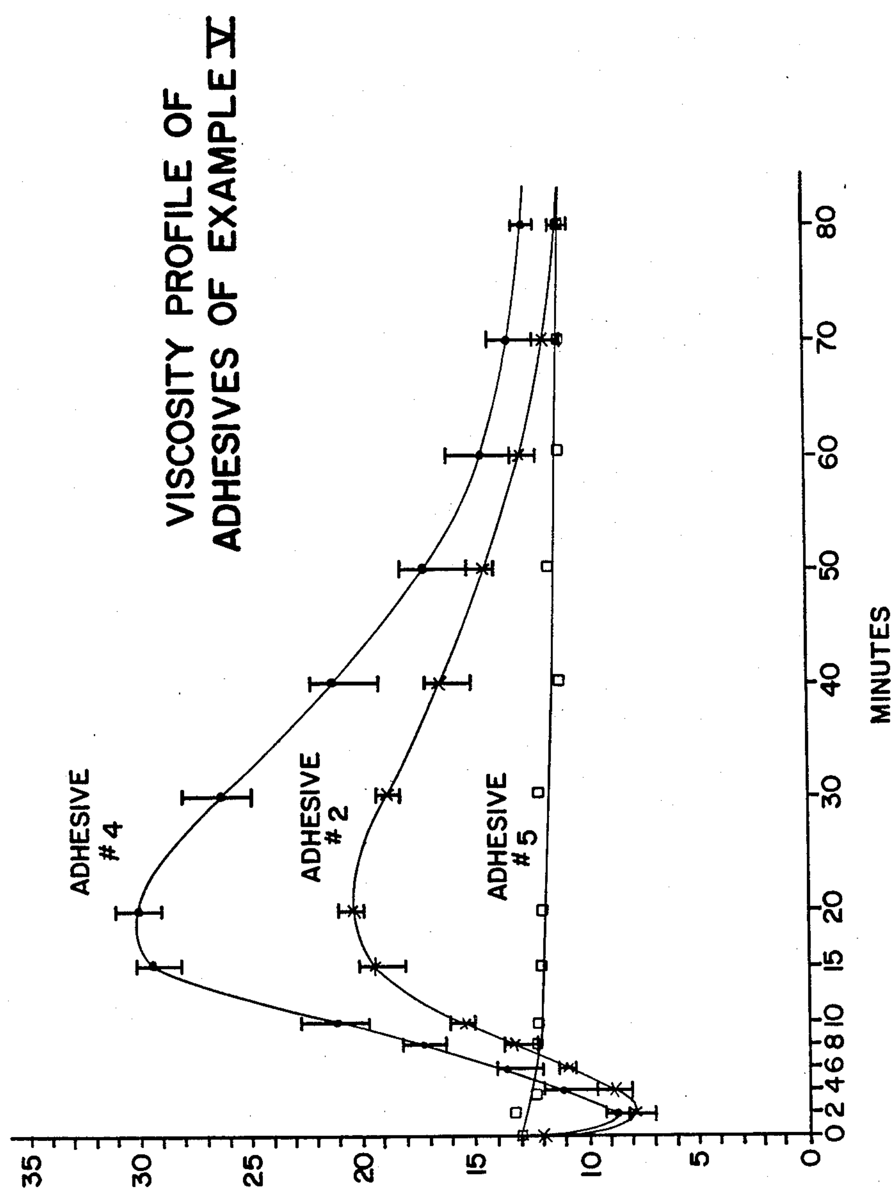
VISCOSITY PROFILE OF
ADHESIVES OF EXAMPLE V
ADHESIVE
4
ADHESIVE
2
ADHESIVE
5
MINUTES
0 2 4 6 8 10
15
20
30
40
50
60
70
80
0
5
10
15
20
25
30
35

SUBSTANTIALLY VISCOSITY STABLE MOISTURE-RESISTANT CORRUGATED BOARD ADHESIVE

FIELD OF THE INVENTION

The invention relates to an aqueous, starch-based adhesive composition containing a reactive crosslinking resin that can impart moisture resistance to the cured glue lines in corrugated board. More particularly, the invention relates to an aqueous corrugating adhesive, and to its manufacture, that is formulated from components that limit undesirable viscosity increase during preparation steps which include the step of adding the resin to an aqueous-starch base.

BACKGROUND OF THE INVENTION

The moisture sensitivity of corrugated board structural adhesives continues to be a difficult problem for those using shipping or storage containers made of corrugated paperboard. Corrugated board is made by gluing paper members with a starch-based adhesive composition. The resulting corrugated board product can lose strength due to the effect of humidity, mist, rain or standing water on both the starch adhesive and the paper members which can be hydrophilic or water sensitive.

Starch-based adhesives are used in paperboard manufacture by coating an aqueous starch suspension onto corrugated paperboard members, contacting the members and heating the suspension to cure the adhesive bond. The starch molecules bond the paper members through hydrogen bonds between the starch polysaccharides and the polysaccharides in the paper members. However, the adhesive can remain somewhat hydrophilic and can absorb substantial amounts of water. The starch in the presence of such water can return to a suspension or emulsion of starch in the water derived from the environment and as a result can rapidly lose bond strength. Similarly, the paper used in making corrugated board is generally formed from a water slurry of cellulose fibers derived from wood or other plant sources which is made into a sheet by removing water from the sheeted slurry. The sheet is commonly rolled and dried to remove residual water resulting in finished paper. The resulting paper can be water sensitive since its component parts are hydrophilic and can tend to revert partly, in the presence of water, to the dispersion of cellulose particles in water from which it was prepared.

Many adhesives for preparing corrugated board have been proposed in the past including aqueous starch-based adhesives, hot melt thermoplastic adhesives, hot melt coated string-like adhesives, and adhesives comprising aqueous or other emulsions of synthetic polymers.

The preferred adhesive, in commercial use today, is a starch based adhesive with moisture or water resistance derived from formulations including resorcinol-formaldehyde resins, phenol-formaldehyde resins, calcium cyanamide-formaldehyde resins, urea-formaldehyde resins, and ketone-formaldehyde resins. Such resins are chemically reactive and tend to increase water resistance of the bond line by reacting with and crosslinking starch molecules through hydroxyl groups. By crosslinking the starch molecules, hydrophobicity of the bond line is increased since the molecular weight of the starch is increased through crosslinking and the number of available hydrophilic hydroxyl groups are reduced through the crosslinking reaction. Accordingly, the chemical reactivity of the water resistant resins is important in imparting water resistance. However the reactivity of the resins can cause problems in both adhesive formulation and use.

In the manufacture of resin containing water resistant starch-based corrugating non-borated carrier corrugating adhesives, during and after the addition of the water resistant resin composition to starch slurries, the viscosity of the material can show a significant increase which can last for fifteen to sixty minutes after preparation. In borated carrier corrugating adhesives the viscosity increase can last for much longer times and can be permanent. Note that borax is present in all such adhesives. The primary difference is in the location of the boron compounds. Depending on preparation methods, the boron compounds can end in either the carrier phase or the secondary phase. Such increase can be a significant detriment in the mixing, pumping and application of the starch-based adhesives during adhesive preparation and corrugated board manufacture in corrugating machines. Such unwanted rapid viscosity increase is known as "resin-shock" in the corrugated paperboard industry. While we do not wish to be held to a theory of any aspect of this invention, persons skilled in this art believe that resin-shock is a result of an interaction between the resin (including resin impurities and by-products) and the starch in the adhesive composition.

Accordingly, a substantial need exists in the art to prevent "resin-shock" during the manufacture of starch-based adhesives with water-resistant resins, without having a significant negative impact on the manufacturing aspects or ease of use of the adhesive compositions or the quality of the resulting corrugated board. More particularly, it is important that the machining, viscosity, and bond strength of the adhesive in wet and dry corrugated paperboard be maintained in the absence of significant "resin-shock".

BRIEF DESCRIPTION OF THE INVENTION

We have found that a starch-based corrugating adhesive can be prepared by formulating in an aqueous diluent, an appropriate amounts of starch, a source of alkalinity, a boric acid compound, a hydroxy-containing hydrocarbon compound, a resin that can provide water resistance to the cured bond line, and other optional adhesive components including such compositions as a wax, a polyvinyl alcohol composition, clays and others. We have found that there is some interaction between the components of the starch-based adhesive composition and the hydroxy hydrocarbon compound of the invention that prevents the undesirable increase in viscosity after formulation of the adhesive. While we do not wish to be held to a theory of action of the invention, the hydroxy groups of the hydroxy organic compound appear to interact with the boric acid compound or the resin of the invention to prevent unwanted binding to soluble starch molecules which binding can tend to increase viscosity and lead to "resin-shock". In the manufacture of corrugating board, the starch-based adhesives gel at the high temperatures common in corrugating machines. We have found that the hydroxy organic compounds of this invention, while useful in preventing interaction between the adhesive components prior to gellation, apparently do not produce measurable and significant reductions in bond strength of the bond lines in the finished corrugated board when dry or when wet.

The starch-based adhesives of this invention are commonly characterized as being either a carrier adhesive or a carrier/no carrier adhesive. The term carrier adhesive implies the presence of a thin base of gelatinized starch in which ungelatinized or nonhydrated starch particles are emulsified or suspended. The term no carrier adhesive implies the substantial absence of gelatinized or hydrated starch in the adhesive emulsion. The term carrier/no carrier adhesive implies that the distinction between gelatinized starch and ungelatinized starch is not distinct in the adhesive composition. Generally carrier/no carrier adhesives are prepared in a way that a substantial amount of partly hydrated or partly gelatinized starch are formed. These terms are not precise since during the preparation of the starch-based adhesives some starch inherently becomes gelatinized during processing at any temperature and some starch remains ungelatinized and nonhydrated during preparation and use. The important characteristics of the invention are that the adhesive not suffer significant viscosity increase due to "resin-shock", that the starch during curing crosslinks and dehydrates to form a quality bond and that the strong base and boric acid compound provide low cure temperatures and strong high quality bonds after curing.

Surprisingly, we have found that the components of the novel adhesive composition of the invention cooperate to produce an adhesive of handleable viscosity and a useful pot life of greater than about 4 hours and up to 24 hours. Pot life is generally considered to be the time during which the adhesive can be maintained in the corrugating machine at an elevated application temperature, can maintain viscosity and can form useful bonds. During the time the adhesive is maintained at elevated temperature, both mechanical agitation, chemical action and heat can degrade starch molecules substantially reducing molecular weight, solution viscosity, applicability, and potential bond strength. As the adhesive nears the end of its pot life, viscosity, applicability, curing time, and resulting bond strength between corrugated board paper members drops rapidly.

A first aspect of this invention is the novel corrugated board adhesive. A second aspect of the invention is a process for making corrugated board which comprises forming a glue line between corrugated board paper members using the novel adhesive composition of the invention. A third aspect of the invention comprises a method for the manufacture of the novel adhesive of the invention. A fourth aspect is the corrugated board product made with the adhesive of the invention.

The novel corrugating board adhesive composition of this invention can be prepared from a concentrate composition that can be added to an adhesive preparation. During the manufacture of the starch based corrugating board adhesive of the invention, a concentrate comprising a water proofing resin selected from the group consisting of basically reacting crosslinking resin and about 10 to 300 parts of a hydroxy-substituted hydrocarbon compound can be added to the starch based adhesive composition per each part of the crosslinking resin. Typically the concentrate comprises an emulsion of the hydroxy-substituted hydrocarbon compound and the crosslinking resin in an aqueous base.

BRIEF DESCRIPTION OF THE DRAWING

FIG. 1 shows the time versus viscosity profile of the adhesive of Example V.

DETAILED DESCRIPTION OF THE INVENTION

Briefly, the novel corrugated board adhesives of this invention are prepared by forming an aqueous emulsion, having a pH greater than about 8, of starch in the form of a dispersion of an ungelatinized starch or a gelatinized starch, a basically reacting (at pH greater than 8) crosslinking resin, a hydroxy-substituted compound, a strong alkali metal hydroxide base and a boric acid compound. The preferred corrugated paperboard carrier adhesive of this invention is formed from a suspension of ungelatinized starch particles in a thin paste of gelatinized starch, called the carrier phase. The viscosity and solids content of the paste are important factors influencing the speed with which the paperboard machine can be operated and also affects the quality of the finished paperboard. The suspending paste or carrier medium must be sufficiently viscous to maintain a smooth suspension of the nongelatinized starch particles, but not so viscous as to interfere with the application of the adhesive to the paperboard. In this regard "resin-shock" related viscosity increase can prevent successful board manufacture. The nature and proportion of dissolved solids in the carrier medium influences both pot life and the speed with which a given paper stock absorbs water from the applied adhesive. The water content of the adhesive affects adhesive properties. A small degree of water absorption from the adhesive to the paper is desirable in forming strong bonds between the paper plies. Absorption of water beyond that required to give good bonding is undesirable since it robs the adhesive of water needed to complete the gelatinization of the suspended starch upon heating in the corrugator and leads to inferior bonding.

Starch

The starch used in both the carrier phase and suspended starch phase is a commodity chemical produced from a number of plant sources such as root, stem or fruit. Starch is a high molecular weight polymeric carbohydrate polysaccharide, most commonly composed of six carbon monosaccharide units joined by alpha-glycan linkages having an approximate molecular formula of $(C_6H_{10}O_5)_n$, wherein n equals $10^2$ to $10^6$. Starch occurs naturally in the form of white granules and comprise linear and branched polysaccharide polymers. Starch is commonly manufactured by first soaking and grinding the plant starch source, and separating the starch from waste matter. The starch is commonly reslurried and processed into a finished dried starch product. Commercial starch often has the form of a pearl starch, powdered starch, high amylose starch, precooked or gelatinized starch, etc. Preferably pearl starch is used in making the carrier phase and in the particulate starch suspended phase in the carrier phase.

Crosslinking Resins

Resins that can be used in the novel adhesive compositions of this invention include resins that upon heating in basic media generate crosslinking species that can react with and crosslink the hydroxyls in adjacent starch molecules. The crosslinking resin tends to reduce the hydrophilic nature and the water solubility of the starch molecules by effectively removing the availability of hydroxyl groups to water and by introducing aliphatic alkylene-type crosslinking moieties.

A preferred class of crosslinking resins comprise well known condensation products of the reaction of a carboxyl compound and other reactive compounds. These resins are characterized as a polyether polymer but can contain a variety of other monomers such as $C_{1-6}$ aldehydes, $C_{1-6}$ ketones, phenols, resorcinol, urea, melamines, etc. In the presence of heat and base, they commonly depolymerize to produce species that effectively crosslink the starch molecules. Examples of preferred resins are acetone-formaldehyde resins, urea-formaldehyde resins, acetone-urea-formaldehyde resins, acetone-melamine-formaldehyde resins comprising 15 to 30 wt-% acetone, about 5 to 50 wt-% formaldehyde and 0 to 15 wt-% of third monomer. One example of the preferred crosslinking resin embodiment of this invention comprises the KETACK® series of resins manufactured by American Cyanamide, Dacrez made by NSC, Halorez made by Harper-Love, EZ Rez 2714 made by Corrugating Chemicals, APC 6010 made by Georgia Pacific, Mechemrez 100 made by Michelman, Hydratite made by Harper-Love, Aquatite II made by Grain Processes, WS resins made by Borden Chemicals, and the FULLREZ® resin made by H. B. Fuller Company. The basic reacting crosslinking resin can take the form of a resin wherein the hydroxy-substituted hydrocarbon compound is present in the reaction mixture during the preparation of the resinous crosslinking agent and is incorporated into the resin.

Water Soluble Hydroxy-Substituted Organic Compound

The starch-based aqueous adhesives of this invention can contain a water soluble hydroxy-substituted hydrocarbon compound. A hydroxy-substituted hydrocarbon compound can be used to control viscosity increase of the aqueous suspension during manufacture and substantially prevent "resin-shock". The hydroxy-substituted hydrocarbon compound appears to interact with the adhesive components, particularly with the starch particles, the boric acid compound, the resins or with combinations thereof, to prevent unwanted chemical interactions resulting in thickening.

The water soluble hydroxy-substituted hydrocarbon compounds of this invention are typically of moderate to low molecular weight, less than 10,000, preferably less than about 2,000, having 1 to 400 carbon atoms and from about 1 to 6 hydroxyl groups. The preferred hydroxy-substituted hydrocarbon compounds can contain ether links between hydrocarbon groups but are free of pendent fractional groups such as amino, nitro, sulfhydryl, phosphonyl, carboxyl and others. Preferred hydroxy-substituted hydrocarbon compounds include $C_{1-3}$ alcohols, mono-, di- and trisaccharides, cyclic or linear polyols such as inositol, sorbitol and mannitol, polyalkylene oxide polymers having a molecular weight of less than about 2,000, preferably less than about 1,000 such as polyethylene oxide, polypropylene oxide, and others. The most preferred water soluble hydroxy-substituted hydrocarbon compounds of the invention include the $C_{1-3}$ compounds having from about 1 to 3 hydroxyl groups. Included within this broad class are methanol, ethanol, propanol, isopropanol, ethylene glycol, propylene glycol, diethylene glycol ($HOCH_2CH_2OCH_2CHOH$), dipropylene glycol, glycerol, glucose, galactose, fructose, ribose, mannitol, and other similar compounds.

Polyvinyl Alcohol

Polyvinyl Alcohol (PVOH), a polyhydroxy polymer having a polymethylene backbone with pendent hydroxy groups, is a synthetic resin that can be water soluble. Polyvinyl alcohol polymers are produced by the hydrolysis of corresponding polyvinyl acetate polymers. The theoretical monomer

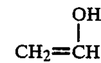

does not exist. Polyvinyl alcohol is one of the very few high molecular weight commercial polymers that can be made in water soluble forms. Commonly available polyvinyl alcohol is sold in the form of a dry solid and is available in granular or powdered forms. Commercial polyvinyl alcohol materials are most commonly distinguished by their degree of hydrolysis (i.e., basic hydrolytic removal of acetate from polyvinyl acetate polymers) and molecular weight measured by viscosity.

Polyvinyl alcohol products include a "super" hydrolyzed form (99.3% plus removal of the acetate groups), a fully hydrolyzed form (99% plus removal of the acetate groups), a form of intermediate hydrolysis (about 98 to 91% removal of the acetate groups), and a partially hydrolyzed (about 91 to 85% removal of the acetate group) polyvinyl alcohol. The properties of the polyvinyl alcohol resins vary according to degree of hydrolysis, the molecular weight of the parent polymer. The molecular weight of commercial polyvinyl alcohol polymer preparations is reflected in the viscosity of a 4 wt-% aqueous solution measured in centipoise (cP) at 20° C. with a Brookfield viscometer. The viscosity of a 4% aqueous solution can range from about 5° to about 65° cP. Variation in film flexibility, water sensitivity, ease of solvation, high viscosity, block resistance, adhesive strength, dispersing power, can all be varied by adjusting molecular weight or degree of hydrolysis. Polyvinyl alcohols are known to be reactive with aldehydes to form acetals, can be reacted with acrylonitrile to form cyanoethyl groups, and can be reacted with ethylene or propylene oxide to form hydroxy alkylene groups. Polyvinyl alcohols can be readily crosslinked. Polyvinyl alcohol is made by first forming polyvinyl acetate or a vinyl acetate containing copolymer such as ethylene vinyl acetate copolymer and removing the acetyl groups using a base catalyzed alkanolysis. Production of polyvinyl acetate or a vinyl acetate copolymer can be done by conventional processes which control the ultimate molecular weight. Catalyst selection, temperatures, solvent selection and chain transfer agents can be used by persons skilled in the art to control molecular weight. The degree of hydrolysis is controlled by preventing the completion of the alkanolysis reaction. Polyvinyl alcohol is made in the United States by Air Products and Chemicals Inc. under the name VINOL®, by duPont under the trade name ELVANOL®, and by Monsanto under the trade name GELVITOL®.

Base

The novel adhesive compositions of the invention contain a strong base which promotes the production of crosslinking species from the resin and acts to cure the adhesive. Essentially any strong base can be used, however preferred bases are alkali metal hydroxides. The most preferred strong bases inolude sodium and potassium hydroxide. The strong base also lowers the gel point of the starch, which increases the rate of hydration of the starch during curing of the glue line.

Boric Acid Compound

The novel adhesive compositions of the invention include a boric acid compound which cooperates with the gelatinized and nongelatinized starch during heating and curing by reacting with available hydroxyl groups of the starch, forming a starch borax complex which aids in gelling the carrier starch molecules and the suspended starch molecules. The cooperative reaction increases the tack of the adhesive and produces strong bonds. Any boric acid compound having free hydroxyl groups attached to the boron atom can be used, however commercial boric acid (orthoboric acid, $H_3BO_3$ and its hydrated forms and borax (sodium tetraborate decahydrate, $Na_2B_4O_7.10H_2O$ and other hydrate and anhydrous forms) are commonly used. For a discussion of boric acid compounds such as boron oxides, boric acids and borates, see Kirk-Othmer Encyclopedia of Chemical Technology, 2nd Edition, Vol. 3, pp. 608–652. The boric acid compound increases the tackiness, viscosity, and cohesive strength of the adhesive. As the adhesive cures in the glue line, a gel structure forms between the boric acid compound hydroxyl group and the hydroxyl groups of the polysaccharide. The exact mechanism of the reaction between the boric acid compound and the starch is unknown. Further, the borax buffers the caustic nature of the base used in the adhesive stabilizing the adhesive to the hydrolytic effect of the base.

Wax

The term wax is used very broadly and is applied to a wide variety of materials. The materials can have properties resembling certain well known waxes or can be used to provide physical properties similar to those associated with well known properties of wax such as sealing, polishing, candle making, etc. Many waxy substances have been found in nature and have been known to be useful for many years.

Historically waxes include substances that are natural products. Chemically natural waxes are esters of fatty acids and monohydric fatty alcohols. Physically waxes are water repellant solids having a useful degree of plastic character. However, modern waxes include various synthetic substances that can replace natural waxes in many preparations. The composition of natural waxes generally comprises an ester of a saturated fatty acid and a long chain monohydric alcohol. Long chain fatty acids often include acids having greater than 16 carbon atoms and most commonly about 26 carbon atoms. The aliphatic monohydric alcohol commonly has at least 14 and an range as high as 36 carbon atoms. Petroleum, mineral or other synthetic waxes often consist of saturated hydrocarbons having aliphatic or open chain structures with relatively low branching or side chains.

Particularly preferable waxes for the water resistant corrugated board adhesive area waxes such as petroleum waxes, candelilla wax, beeswax, etc. Particularly preferred waxes are the petroleum waxes such as microcrystalline waxes, slack waxes, and paraffin waxes.

In somewhat greater detail, the novel adhesives of this invention are made by first combining water and starch and then adding the balance of the components. Broadly, the major formulating consideration is that the hydroxy compound must be added at such a time that it does not cause significant vicosity increase in the resin composition. Typically the hydroxy compound can be added at any time that viscosity increase does not occur. The hydroxy compound can be added before, with or just after the resin. Preferably the adhesive is made by first forming a carrier phase comprising water, gelatinized starch and strong base. The carrier phase is made by mixing water with about 1 to about 25 parts of starch and about 0.1 to about 10 parts of strong base. The mixture is blended until uniform and heated to gelatinize or hydrate the starch particles if needed. The carrier phase is then combined with additional particulate starch, the boric acid compound, the hydroxy-substituted hydrocarbon compound, the crosslinking resin, and additional amounts of water or strong base if needed. Optionally, before addition, the resin and hydroxy-substituted hydrocarbon compound can be premixed or pre-reacted. About 5 to 50 parts of additional starch per 100 parts of water, about 0.1 to 5.0 parts of boric acid compound per 100 parts of water, and about 0.1 to about 5 parts of basically reacting resin per 100 parts of water and about 0.1 to 5 parts of wax per 100 parts of water can be post-added. The mixture can be heated, to partly hydrate or gelatinize the starch.

The adhesives of the invention can be formulated as described above and in other standard formulations to provide adhesives having the following contents:

| Adhesive Formulations | Useful* | Preferred | Most Preferred |
|---|---|---|---|
| Starch | 5–50 | 20–32 | 22–28 |
| Alkali metal hydroxide | 0.3–1.0 | 0.4–0.8 | 0.4–0.7 |
| Boric acid compound | 0.05–0.5 | 0.1–0.4 | 0.2–0.3 |
| Resin | 0.1–5 | 0.5–3 | 0.75–2 |
| Hydroxy Compound | 0.1–5 | 0.5–3 | 0.75–2 |
| Water | Balance | Balance | Balance |

*Parts per each 100 parts of adhesive (by weight).

Since the —OH groups of the hydroxy compound appear to be the active moiety in the reduction of resin-shock in the adhesive formulation, an amount of hydroxy compound is added to the adhesive formulation to provide about 1 to 15 moles of hydroxyl (—OH) group per each mole of active monomer in the resin. Preferably about 5 to 10 moles of hydroxy group and most preferably about 8 to 10 moles of hydroxy group are used per mole of active monomer in the resin for reasons of resistance to resin-shock, low cost and ease of preparation.

A wax can be added for added waterproofing in the form of an emulsion of the wax in water. The wax emulsions preferred in the invention are commonly made by suspending wax in water using commonly available emulsifying agents. A particularly advantageous wax emulsion is prepared by adding about 10 to 40 parts of nonionic slack wax to about 10 parts of hot water in the presence of a nonionic surfactant. The mixture is blended until uniform an about 40 parts of warm water is added along with about 3.3 parts of urea. The mixture is blended until uniform and an antifoam agent is added and additional water is provided until the proper wax concentration is reached.

The final adhesive composition of the invention contains about 10 to 80 wt-%, preferably 10 to 40 wt-%, and most preferably 20 to 40 wt-% solids for reasons of viscosity control and application speed. The pH of the adhesive is greater than about 8, preferably in the range of 9 to 13, and most preferably for reasons of low gel point and rapid cure of the glue line, about 11 to 12.

The following Examples describe the preparation of the novel adhesives of this invention and contain a best mode.

EXAMPLE I

Carrier Starch Adhesive

Primary Blend

Into an approximately 1.5 liter stainless steel beaker having a mechanical stirrer mounted in a water bath at 49° C. (130° F.) was placed 625.5 grams of water. Into the water was mixed 112.5 grams of STALEY® pearl starch and a solution of 27.0 grams of sodium hydroxide in 62.5 grams of water. The mixture was stirred until blended and maintained at a temperature of about 49° C. (130° F.) for 15 minutes. At the end of this period 437.8 grams of water was added to the beaker reducing the temperature to 110° F. At the same time the temperature of the water bath was reduced to match the beaker contents.

Secondary Blend

Separately in an approximately 1 gallon horizontal trough mixer equipped with a horizontal 5-blade agitator was added 2081.2 grams of water, 1050.0 grams of a STALEY® pearl starch and 12.6 grams of borax ($Na_2B_4O_7.5H_2O$). The contents of the trough mixer were blended and into the trough mixer was added the contents of the stainless steel beaker dropwise over a 30-minute period from a calibrated dropping funnel.

Resin Preparation

In a separate 1 liter glass beaker was placed 200 grams of an acetone-formaldehyde resin (M.W. 150-500 g/mole, 50% by weight aqueous solution, 1:4 acetone:-formaldehyde) sold as FULLREZ®. Into the stirred aqueous solution was slowly added 40 grams of ethylene glycol (1 mole equivalent). The pH of the mixture was adjusted to about 11.3 by the drop-wise addition of a 27.9 wt-% aqueous potassium hydroxide solution. The mixture was heated to 60° C. for 2.5 hours and then allowed to cool to room temperature. After reaction the pH of the mixture was 8 and the viscosity was 40 cP (Brookfield viscometer, 20 r.p.m., Spindle No. 2 at room temperature).

To 400 gram aliquots of the carrier starch adhesive prepared above was added the following additives: (1) a control with no additives, (2) 6.0 grams of an aqueous 50 wt-% acetone formaldehyde resin solution (M.W. 150-500 g/mole, 1:4 acetone:formaldehyde), (3) 6.0 grams of the ethylene glycol-acetone formaldehyde resin preparation, (4) 7.2 grams of the ethylene glycol-acetone formaldehyde resin preparation, (5) 6.0 grams of ethylene glycol followed by 6.0 grams of aqueous 50 wt-% acetone formaldehyde resin solution (M.W. 150-500, 1:4 acetone:formaldehyde), and (6) 6.0 grams of 2-amino-2-methyl-propanol followed by 6.0 grams of an aqueous 50 wt-% acetone formaldehyde resin solution (M.W. 50-500, 1:4 acetone:formaldehyde). After the addition of the above ingredients the solutions were blended for 30 seconds and permitted to stand for 30 minutes. The viscosities were measured by Brookfield viscometer at 20 r.p.m., at room temperature, using the Spindle shown in the Table.

TABLE 1

| | Viscosity of Blends | | | |
|---|---|---|---|---|
| Adhesive | cP @ 30 Min. | (Spindle) | cP @ 90 Min. | (Spindle) |
| 1 | 380 | (2) | 386 | (2) |
| 2 | 10,000 | (5) | 20,000 | (5) |
| 3 | 3,600 | (5) | 10,000 | (5) |
| 4 | 12,000 | (5) | 14,000 | (5) |
| 5 | 480 | (2) | 920 | (2) |
| 6 | 320 | (2) | 340 | (2) |

The addition of ethylene glycol minimizes viscosity increase caused by the use of the acetone formaldehyde resin.

EXAMPLE II

To five 300 gram aliquots of the carrier starch of adhesive prepared in Example I was added the following: (1) control with no additives, (2) 4.5 grams of an aqueous 50 wt-% acetone-formaldehyde resin (M.W. 150-500, 1:4 acetone:formaldehyde), (3) 4.5 grams of ethylene glycol followed by 4.5 grams of an aqueous 50 wt-% acetone-formaldehyde resin (M.W. 150-500, 1:4 acetone:formaldehyde), (4) 3.0 grams of ethylene glycol followed by 4.5 grams of an aqueous 50 wt-% acetone-formaldehyde resin (M.W. 150-500, 1:4 acetone:formaldehyde), and (5) 1.5 grams ethylene glycol followed by 4.5 grams of an aqueous 50 wt-% acetone-formaldehyde resin (M.W. 150-500, 1:4 acetone:formaldehyde).

The additives were blended into the adhesive for 30 seconds after which the mixture was allowed to stand for 30 minutes. The viscosities were determined by Brookfield viscometer at room temperature and 20 r.p.m. The viscosities were measured after 30 minutes and at 90 minutes with the spindle shown in the Table.

TABLE 2

| | Viscosity of Blends | | | |
|---|---|---|---|---|
| Adhesive | cP @ 30 Minutes | (Spindle) | cP @ 90 Minutes | (Spindle) |
| 1 | 360 | (2) | 370 | (2) |
| 2 | 12,500 | (6) | 20,000 | (6) |
| 3 | 525 | (3) | 380 | (3) |
| 4 | 1,100 | (3) | 3,400 | (4) |
| 5 | 5,200 | (4) | 10,000 | (5) |

The Table shows that the addition of ethylene glycol to the adhesive systems of the invention decreases the unwanted increase in viscosity caused by the presence of the acetone formaldehyde resin.

The five adhesives described above were used in the preparation of corrugated board samples which were used as test vehicles for the determination of wet pin adhesive strength. (The methods for preparing the corrugated paper board and measuring wet and dry pin values are set forth below.) The samples were soaked in water for 3 hours prior to analysis and subject to analysis according to T.A.P.P.I. Method UM-802. The following Tables detail the results of analysis of corrugated board made with each adhesive 1-5.

TABLE 3

| | Wet Pin Analysis | | | | |
|---|---|---|---|---|---|
| | Adhesive | | | | |
| Sample | 1 (Lbs./Sample) | 2 (Lbs./Sample) | 3 (Lbs./Sample) | 4 (Lbs./Sample) | 5 (Lbs./Sample) |
| 1 | 0.67 | 28.911 | 31.328 | 30.679 | 29.642 |

TABLE 3-continued

| | Wet Pin Analysis | | | | |
|---|---|---|---|---|---|
| | Adhesive | | | | |
| Sample | 1 (Lbs./ Sample) | 2 (Lbs./ Sample) | 3 (Lbs./ Sample) | 4 (Lbs./ Sample) | 5 (Lbs./ Sample) |
| 2 | 1.03 | 29.038 | 30.479 | 32.153 | 30.518 |
| 3 | .89 | 31.807 | 31.440 | 34.209 | 31.812 |
| 4 | — | 32.739 | 32.520 | 31.616 | 25.762 |
| 5 | — | 31.636 | 29.678 | 30.688 | 31.733 |
| 6 | — | 31.890 | 31.670 | 31.958 | 33.555 |
| 7 | — | 31.919 | 29.712 | 32.793 | 28.525 |
| 8 | — | 28.530 | 31.836 | 30.874 | 31.118 |

The results shown in Table 3 show that the addition of ethylene glycol at various loadings to the aqueous starchbase adhesive does not within the statistical accuracy of the measurements of the invention significantly alter the wet pin strength of the corrugated board made with each of the adhesives.

EXAMPLE III

Primary Blend

Into an approximately 1.5 liter stainless steel beaker was placed 625.5 grams of water, 112.5 grams of STALEY® pearl corn starch and a solution of 27.0 grams of solid sodium hydroxide in 62.5 grams of water. The contents of the beaker were heated to 130° F. and maintained at that temperature with agitation for 15 minutes. Into the starch suspension was placed 437.8 grams of water which cooled the suspension to 100° F.

Secondary Blend

Separately, into an approximately 1 gallon horizontal trough mixer having a horizontal agitator equipped with 5 blades was added 2081.2 grams of water, 1050 grams of pearl corn starch, and 12.6 grams of borax ($Na_2B_4O_7.5H_2O$). The material was agitated until well mixed at room temperature and into the room temperature mixture was added drop-wise, from a calibrated dropping funnel over a 30 minute period, the primary cooked portion prepared above.

The resulting adhesive had a pH of 12.3, a Brookfield viscometer viscosity of 405 cP at 20 r.p.m., Spindle No. 2, at room temperature, a gel point of 141° F. and a #5 Zahn cup viscosity of 19 seconds.

Five 400 gm. aliquots of the adhesive prepared above were taken and the following ingredients were added as follows: (1) control with no additives, (2) 6 grams of a 50 wt-% aqueous solution of an aqueous 50 wt-% acetone-formaldehyde resin (M.W. 150–500, 1:4 acetone:-formaldehyde), (3) 6 grams of ethylene glycol and 6 grams of an aqueous 50 wt-% acetone-formaldehyde resin (M.W. 150–500, 1:4 acetone:formaldehyde), (4) 10.2 grams of diethylene glycol and 6 grams of an aqueous 50 wt-% acetone-formaldehyde resin (M.W. 150–500, 1:4 acetone:formaldehyde), (5) 6.2 grams of methanol and 6 grams of the aqueous 50 wt-% acetone-formaldehyde resin (M.W. 150–500, 1:4 acetone:formaldehyde). The viscosities of the resulting adhesives were measured at 10, 30, and 90 minutes using a Brookfield viscometer at room temperature with 20 r.p.m. The viscosities and spindle used are recorded in the following Table.

TABLE 4

| | Viscosity of Blends | | | | | |
|---|---|---|---|---|---|---|
| Solution | cP @ 10 Min. | (Spindle) | cP @ 30 Min. | (Spindle) | cP @ 90 Min. | (Spindle) |
| 1 | 410 | (2) | 440 | (2) | 450 | (2) |
| 2 | 775 | (3) | 20,000 | (6) | 25,000 | (6) |
| 3 | 380 | (2) | 2,250 | (3) | 4,400 | (5) |
| 4 | 390 | (2) | 1,000 | (3) | 3,900 | (5) |
| 5 | 400 | (2) | 875 | (3) | 2,600 | (5) |

The above data shows that the samples containing both hydroxy compound and resin have significantly improved viscosities when compared to the adhesive containing only the resin (adhesive (2)).

EXAMPLE IV

The carrier starch blend of Example III was prepared exactly except that the secondary blend, prior to the addition of the primary blend, was formulated with the same ingredients and with 66.0 grams of ethylene glycol.

Two 400 gram aliquots of the ethylene glycol containing modified carrier starch adhesive were taken. The first was used as a control and to the second was added 6 grams of the 50 wt-% aqueous acetone-formaldehyde resin (M.W. 150–500, 1:4 acetone:formaldehyde). The viscosities were taken at 1 minute and 30 minutes using a Brookfield viscometer, Spindle No. 2, at 20 r.p.m. at room temperature. The viscosities are recorded in Table 5.

TABLE 5

| | Brookfield Viscosity | |
|---|---|---|
| Sample | cP @ 60 Seconds | cP @ 30 Minutes |
| 1 | 340 | 360 |
| 2 | 380 | 2,000 |

The above data indicates that adding the hydroxy compound to the starch adhesive prior to the addition of the resin does not reduce the ability to obtain viscosity control.

EXAMPLE V

Five 4,000 gram samples of a carrier starch adhesive composition identical to that prepared in Examples I and III were prepared. One preparation was maintained as a control. To two of the remaining of the samples were added 60 grams of ethylene glycol. To the remaining two samples were added 60 grams of the aqueous 50 wt-% acetone-formaldehyde resin (M.W. 150–500, 1:4 acetone:formaldehyde). After combination the adhesive preparations were measured for #5 Zahn cup vicosity periodically over 80 minutes. (The adhesives were agitated throughout the vicosity measurement period.) The vicosity measurements are shown in the following Table which are also represented in the graph of FIG. 1.

TABLE 6

| | #5 Zahn Cup Viscosity | | | | |
|---|---|---|---|---|---|
| | Adhesive Preparations | | | | |
| Minutes | 1** | 2** | 3** | 4** | 5* |
| 0 | 11/11 | 12/12 | 12/12 | 13/13 | 13/13 |
| 2 | 8/8 | 7/8 | 8/8 | 9/9 | 13/13 |
| 4 | 9/10 | 9/9 | 8/8 | 11/11 | 12/12 |
| 6 | 1/14 | 11/11 | 11/11 | 13/14 | 12/13 |
| 8 | 16/18 | 13/13 | 12/13 | 16/18 | 12/12 |
| 10 | 20/21 | 15/16 | 15/15 | 22/21 | 12/12 |

TABLE 6-continued

| Minutes | #5 Zahn Cup Viscosity Adhesive Preparations 1** | 2** | 3** | 4** | 5* |
|---|---|---|---|---|---|
| 15 | 28/29 | 18/20 | 19/19 | 29/30 | 12/12 |
| 20 | 29/30 | 20/21 | 21/20 | 30/31 | 12/12 |
| 30 | 25/25 | 19/19 | 18/19 | 28/28 | 12/12 |
| 40 | 19/19 | 15/17 | 17/16 | 22/22 | 11/11 |
| 50 | 16/15 | 14/14 | 15/15 | 18/18 | 12/11 |
| 60 | 14/13 | 13/13 | 12/13 | 15/16 | 11/11 |
| 70 | 12/13 | 11/12 | 11/12 | 14/14 | 11/11 |
| 80 | 12/12 | 11/11 | 11/11 | 13/13 | 11/11 |

*Control (no resin no glycol).
**#1 through #4 have resin, only; #2 and #3 have glycol.

The above data show that the vicosity at 15–40 minutes after preparation of adhesive with resin is significantly higher than adhesive with resin and glycol.

EXAMPLE VI

Primary Blend

Into a 1.5 liter stainless steel beaker in a water bath equipped with a mechanical stirrer was added 749.7 grams of water which was heated to 145° F. Into the heated water was placed 200 grams of STALEY® pearl starch followed by 4 grams of sodium borate pentahydrate and a caustic solution comprising 83.3 grams of water and 36 grams of sodium hydroxide. After a 20 minute mixing period, 834 grams of water was added to the mixture cooling the contents to about 100° F.

Secondary Blend

Into a separate, approximately 1 gallon trough mixer equipped with a horizontal 5-blade agitator was added 2748.9 grams of water, 14 grams of sodium borate pentahydrate and 1300 grams of corn starch. After agitation the primary prepared above was added drop-wise over a 30 minute period from a dropping funnel into the secondary blend. After completion the adhesive was mixed for 10 minutes and the resulting adhesive had a viscosity at 98° F. of 7 #5 Zahn cup seconds, a gel point of 146° F. and a pH of 12.1.

Three 1,000 gram aliquots of the above adhesive were taken having an initial viscosity of 7 #5 Zahn cup seconds. To each of the samples were added the following ingredients: (1) 13.2 grams of an aqueous 50 wt-% active aqueous 50 wt-% solution of an acetone-formaldehyde resin (M.W. 150–500, 1:4 acetone:formaldehyde), (2) 13.2 grams of the aqueous resin of part (1) with 13.2 grams of ethylene glycol, (3) 13.2 grams of the aqueous resin of part (1) with 25.5 grams of isopropanol. The alcohols in samples (2) and (3) provide equal protection from unwanted viscosity increase due to the presence of the crosslinking resin in the adhesive. The amounts of isopropanol and ethylene glycol provide substantially the same incremental amount of hydroyl to the adhesive composition.

EXAMPLE VII

Example VI was repeated exactly except that in the three 1,000 gram aliquots 15.3 grams of dextrose was substituted for the 25.5 grams of isopropanol in part (3). The viscosity of the preparations were measured and are shown in the following Table.

TABLE 7

| Sample | #5 Zahn Cup Viscosity (#5 Zahn Cup Seconds at 75° F.) 0 Minutes | 10 Minutes | 30 Minutes | 60 Minutes | 90 Minutes |
|---|---|---|---|---|---|
| 1 | 6.5 | 7.8 | 8.2 | 8.4 | 8.9 |
| 2 | 6.5 | 6.9 | 7.1 | 7.3 | 7.5 |
| 3 | 6.4 | 6.9 | 7.1 | 7.3 | 7.4 |

EXAMPLE VIII

The preparation of the borated carrier starch base in Example VII was repeated exactly except that after the addition of the primary to the secondary an additional 90 grams of 18 wt-% aqueous solution of an 87 wt-% partially hydrolyzed low molecular weight polyvinyl alcohol was added to the adhesive. Three 1,000 aliquots of this sample were taken and into the samples were added the following ingredients: (1) 13.2 grams of the aqueous 50 wt-% acetone-formaldehyde resin solution of Example I, (2) 13.2 grams of the aqueous 50 wt-% acetone-formaldehyde resin solution of Example I along with 6.6 grams ethylene glycol, and (3) 13.2 grams of the aqueous 50 wt-% acetone-formaldehyde resin solution of Example I along with 13.2 grams of ethylene glycol.

Samples were taken from the bulk adhesive preparations and measured for viscosity as shown in the following Table.

TABLE 8

| Sample | #5 Zahn Cup Viscosity (#5 Zahn Cup Seconds at 75° F.) 0 Minutes | 30 Minutes | 60 Minutes | 90 Minutes | 120 Minutes | 150 Minutes |
|---|---|---|---|---|---|---|
| 1 | 9 | 19 | 24.8 | 28.0 | 29.3 | 32.0 |
| 2 | 8 | 13 | 15.2 | 17.0 | 18.0 | 19.5 |
| 3 | 7.2 | 15 | 18.8 | 19.3 | 19.5 | 20.5 |

The three aliquots taken in Example VIII after addition were sampled for adhesive as follows:

TABLE 9

| Time | Sampling Times Sample 1 | Sample 2 | Sample 3 |
|---|---|---|---|
| 0 | A0 | B0 | C0 |
| 1 Hour | A1 | B1 | C1 |
| 15.5 Hours | A2 | B2 | C2 |
| 20.5 Hours | A3 | B3 | C3 |

The following procedure was used to make the corrugated boards and measure the wet and dry pin adhesive values of this Example and Example II.

"C" flute material was cut into 5"×6" rectangles wherein the flutes were parallel to the 5" side. The facing medium (wet strength sized liner board) was cut into 6"×8" rectangles wherein the grain of the board is parallel to the length-wise direction. Adhesive taken at the appropriate time was applied in a 6 mil film to a glass plate. Onto the 6 mil film was placed the 5"×6" flute sheet, flute side down, on the adhesive. A smooth application of adhesive to the flute was ensured by pressing the flute back with the fingertips to the adhesive film. The coated flutes were then contacted with the green side of the liner board. The combined liner board and flute board were placed on a hot surface heated to 280° F. The adhesive was secured by pressing the board with a glass plate on the heated surface for 10 seconds. The glass plate equipped with a handle weighed 7.3 pounds. The board was removed from the plate and allowed to cool and tested for bond strength in the wet and dry condition.

The pin adhesion test of corrugated fiberboard established by the T.A.P.P.I. (Technical Association Paper and Pulp Industry). In this test the force required to separate the liner from the flute of the corrugated board is measured In the test a rigid 4"×4" square template is placed on the bonded side of the board so that the liner board is on the top. Two 2"×4" corrugated board pieces are cut from the board with a razor knife and are labeled. The pieces are cut so that the flutes are parallel with the 2" side. After aging the board a minimum of 24 hours at ambient temperatures, the bonded samples (for the wet pin test) are immersed in water at ambient temperature and allowed to soak for 3½ hours. The soaked samples are inserted onto the pin testing jig making sure that the pins are inserted between the single face side and the bonded planar board and not through the single face side alone. The soaked samples are debonded in an Instron device at a cross set speed of 2" per minute by using compression to separate the liner board from the bonded medium. The debonding strength is noted in pounds per square inch of specimen. The dry pin results are obtained using the same procedure except that the board is not soaked prior to testing.

TABLE 10

| Wet Pin Average Analysis (Lbs./Sample) | |
|---|---|
| Sample | Wet Pin |
| A0 | 19.26 |
| A1 | 17.5 |
| A2 | 11.1 |
| A3 | 13.3 |
| B0 | 19.3 |
| B1 | 16.4 |
| B2 | 14.2 |
| B3 | 13.4 |
| C0 | 17.9 |
| C1 | 14.9 |
| C2 | 9.0 |
| C3 | 9.3 |

TABLE 11

| Dry Pin Average Analysis (Lbs./Sample) | |
|---|---|
| Sample | Wet Pin |
| A0 | 128.7 |
| A1 | 129.8 |
| A2 | 124.9 |
| A3 | 121.5 |
| B0 | 122.2 |
| B1 | 122.9 |
| B2 | 119.8 |
| B3 | 124.7 |
| C0 | 115.0 |
| C1 | 122.0 |
| C2 | 120.5 |
| C3 | 120.6 |

An examination of the Table set forth above shows that the hydroxy-substituted hydrocarbon compounds of this invention can provide a significant increase in the ability to control unwanted viscosity increases upon the preparation of reactive resin containing starch-based corrugating adhesives.

EXAMPLE IX

In a 500 milliliter round bottom flask fitted with a condensor, a thermometer and a mechanical stirrer was placed 210 grams of an acetone formaldehyde resin (molecular weight 150–500, 1:4 acetone:formaldehyde) with 140 grams ethylene glycol. The pH of the mixture was 8.2. The pH was increased to 10.8 by the addition of 1 milliliter of a 24 wt-% aqueous potassium hydroxide solution. The solution was warmed to 63° C. in a water bath and maintained at that temperature. After 40 minutes at 63° C., the pH had dropped to 9.2 and was raised by the incremental addition of the 24 wt-% aqueous potassium hydroxide solution to 10.2. The reaction was continued for an additional 40 minutes. The reaction was allowed to cool to room temperature and had a viscosity of 22 cP Brookfield viscosity, spindle No. 1, speed 20 r.p.m., at room temperature. The final pH was 7.8

EXAMPLE X

Example VI was repeated exactly through the preparation of the secondary blend. After the preparation of the secondary blend, the primary was added to the secondary over a 20–30 minute period. The viscosity of the final mixture was 12 #5 Zahn Cup seconds, the gel point was 146° F., and the pH was 12.

Four 1,000 gram samples of the above adhesive was gently agitated to simulate storage conditions and to each aliquot was added one of the following: (A) 13.2 grams of an acetone formaldehyde resin (molecular weight 150–500, 1:4 acetone:formaldehyde), (B) a blend of 13.2 grams of ethylene glycol and the resin of part A, (C) an aged blend (greater than 7 days) totalling 26.4 grams of a 50/50 mixture of the adhesive of part A and 13.2 grams of ethylene glycol, and (D) 22 grams of the product of Example IX. The agitation was increased for 5 minutes to assure complete dispersion of the additives A through D throughout the solution, the agitation was decreased to simulate storage conditions, and the viscosity of the resulting adhesives were monitored vs. time. The viscosities are shown in the following table.

TABLE 12

| #5 Zahn Cup Viscosity (#5 Zahn Cup Seconds at 75° F.) | | | | |
|---|---|---|---|---|
| | Sample | | | |
| Time | A | B | D | C |
| 0 | 9 | 8 | 8 | 8 |
| 15 minutes | 17 | 12.6 | 11.5 | 15.5 |
| 60 minutes | 30 | 14.5 | 13.7 | 19.2 |
| 120 minutes | 35 | 15.2 | 15.3 | 20.5 |
| 20 hours | 33 | 19.5 | 21.0 | 27.5 |

The data shown in the above tables demonstrate that a variety of hydroxy containing compounds can be used including water soluble lower alkanols, glycols, polyether compounds, carbohydrates, cyclic hydroxy compounds, and others. Additionally the data indicates that the compounds can be used to control viscosity without significant impact on the wet and dry pin strength of the bonds. Additionally, the data show that the hydroxy compounds of the invention can be used in a variety of corrugating adhesive types and in the presence of differing corrugating adhesive additive systems.

While the above description, Examples and data provide a basis for understanding the invention, since many embodiments of the invention can be made without departing from the spirit and scope of the invention, the invention resides in the claims hereinafter appended.

I claim:

1. A method of preparing corrugated board which comprises coating an adhesive comprising:

(a) an aqueous dispersion of gelatinized starch;

(b) particulate starch particles dispersed in the aqueous dispersion;

(c) about 0.2 to 3 parts of an acetone formaldehyde resin;

(d) about 0.3 to 1 parts of an alkali metal hydroxides;

(e) about 0.05 to 0.5 parts of a boric acid compound; and (f) about 0.2 to 3 parts of a compound selected from the group consisting of methanol, ethanol, propylene glycol, ethylene glycol, glucose, or mixtures thereof, each per 100 parts of the adhesive composition, wherein there are about 1 to 15 moles of hydroxyl group per each mole of ketone in the ketone formaldehyde resin, onto the flutes of a corrugated paperboard and contacting the coated flutes with one or more liner sheets.

2. The method of claim 1 wherein there about 0.1 to about 20 parts of gelatinized starch and about 0.1 to about 60 parts of ungelatinized starch per each 100 parts of starch.

3. The method of claim 1 wherein the ketone formaldehyde resin comprises an acetone formaldehyde resin having a molecular weight of 150–500 g/mole and a molar ratio of acetone to formaldehyde of about 2 to 6:1.

4. The method of claim 1 wherein the alkali metal hydroxide comprises sodium hydroxide and the boric acid compound comprises sodium borate pentahydrate.

5. An aqueous adhesive composition that during preparation is resistant to unwanted vicosity increase, which comprises:

(a) a major proportion of water;

(b) about 5 to 50 parts starch;

(c) about 0.2 to 3 parts of a basically reacting polymeric resinous crosslinking agent;

(d) about 0.3 to 1 parts of an alkali metal hyroxide;

(e) about 0.05 to 0.5 parts of a boric acid compound; and (f) about 0.2 to 3 parts of a water soluble hydroxy-substituted hydrocarbon compound selected from the group consisting of a $C_{1-3}$ lower alkanol, a diol selected from the group consisting of ethylene glycol, diethylene glycol, propylene glycol, dipropylene glycol and mixtures thereof, a carbohydrate compound, and a polyethylene oxide or polypropylene oxide compound, or mixtures thereof each per parts of the adhesive composition.

6. The composition of claim 5 wherein the crosslinking agent is a ketone-aldehyde resin.

7. The composition of claim 5 wherein the crosslinking agent is urea-formaldehyde resin, a phenol-formaldehyde resin, a resorcinol-formaldehyde resin, a melamine-formaldehyde resin, or mixtures thereof.

8. The composition of claim 5 wherein the starch is present in the form of a suspension of ungelatinized starch particles in a carrier phase of gelatinized starch wherein there are about 0.01 to 25 parts of gelatinized starch and about 0.01 to about 75 parts of ungelatinized starch per each 100 parts of starch.

9. The composition of claim 5 wherein the aqueous emulsion has a pH greater than 8.

10. The composition of claim 5 wherein the $C_{1-3}$ lower alkanol is methanol, ethanol, isopropanol, 1-propanol, glycerol, or mixtures thereof.

11. The composition of claim 5 wherein the carbohydrate compound comprises glucose.

12. The composition of claim 6 wherein there are about 5 to 10 moles of hydroxyl group from the hydroxyl compound per each mole of ketone in the crosslinking resin.

13. A concentrate composition that can be added to an adhesive preparation during the manufacture of a starch based corrugating board adhesive which comprises:

(a) a waterproofing resin comprising a reacting ketone-aldehyde resin; and (b) about 10 to 300 parts of a hydroxy-substituted hydrocarbon compound selected from the group consisting of a $C_{1-3}$ lower alkanol, a diol selected from the group consisting of ethylene glycol, diethylene glycol, propylene glycol, dipropylene glycol and mixtures thereof, a carbohydrate compound, and a polyethylene oxide or polypropylene oxide compound, or mixtures thereof per each parts of the resin.

14. The composition of claim 13 wherein the waterproofing resin is an acetone formaldehyde resin having a molecular weight of 150–500 and about 2 to 6 moles of formaldehyde per each mole of acetone.

15. The composition of claim 13 wherein there are about 5 to 10 moles of hydroxy group from the hydroxyl compound per each mole of ketone in the crosslinking resin.

16. The composition of claim 13 wherein the hydroxy-substituted hydrocarbon compound is present in the reaction mixture during the preparation of the resinous crosslinking agent and in part is incorporated in the resin.

17. An aqueous adhesive composition that during preparation is resistant to unwanted vicosity increase, which comprises:

(a) an aqueous dispersion of gelatinized starch;

(b) particulate starch particles dispersed in the aqueous dispersion;

(c) about 0.2 to 3 parts of an acetone formaldehyde resin;

(d) about 0.3 to 1 parts of an alkali metal hydroxide;

(e) about 0.05 to 0.5 parts of a boric acid compound; and (f) about 0.2 to 3 parts of a compound selected from the group consisting of methanol, ethanol, propylene glycol, ethylene glycol, glucose, or mixtures thereof, each per 100 parts of the adhesive composition, wherein there are about 1 to 15 moles of hydroxyl group per each mole of acetone in the acetone formaldehyde resin.

18. The composition of claim 17 wherein there are about 0.1 to about 20 parts of gelatinized starch and about 0.1 to about 60 parts of ungelatinized starch per each 100 parts of starch.

19. The composition of claim 17 wherein the ketone formaldehyde resin comprises an acetone formaldehyde resin having a molecular weight of 150–500 and a weight ratio of acetone to formaldehyde of about 1:1 to 1:2.7.

20. The composition of claim 17 wherein the alkali metal hyroxide comprises sodium hydroxide and the boric acid compound comprises sodium borate pentahydrate.

* * * * *

UNITED STATES PATENT AND TRADEMARK OFFICE

CERTIFICATE OF CORRECTION

PATENT NO. : 4,814,039

DATED : March 21, 1989

INVENTOR(S) : STEPHEN M. WILLGING

It is certified that error appears in the above-identified patent and that said Letters Patent is hereby corrected as shown below:

Column 2, Line 45, for "amounts" read --amount--.
Column 7, Line 3, for "inolude" read --include--.
Column 7, Line 58, for "an"read --a--.
Column 7, Line 63, for "area" read --are--.
Column 8, Line 61, for "an" read --and--.
Column 13, Line 16, for "vicosity" read --viscosity--.
Column 13, Line 59, for "hydroyl" read --hydroxyl--.
Column 15, Line 10, after "measured" add --.--.
Column 17, Line 8, for "hydroxides" read --hydroxide--.
Column 18, Line 23, after "each" add --100--.

Signed and Sealed this

Thirty-first Day of July, 1990

*Attest:*

HARRY F. MANBECK, JR.

*Attesting Officer* *Commissioner of Patents and Trademarks*